United States Patent [19]
Brazas

[11] Patent Number: 5,453,961
[45] Date of Patent: Sep. 26, 1995

[54] PICK-UP DEVICE FOR OPTICAL DISK READOUT USING WAVEGUIDE GRATINGS

[75] Inventor: John C. Brazas, Rochester, N.Y.

[73] Assignee: Eastman Kodak Company, Rochester, N.Y.

[21] Appl. No.: 376,472

[22] Filed: Jan. 20, 1995

Related U.S. Application Data

[63] Continuation of Ser. No. 4,026, Jan. 15, 1993, abandoned.

[51] Int. Cl.$^6$ ................................................. G11B 7/095
[52] U.S. Cl. .................................... 369/44.23; 369/44.24; 369/112
[58] Field of Search ........................... 369/44.12, 44.14, 369/44.23, 44.32, 112, 124, 44.24; 359/565, 566, 569, 571, 573, 574; 385/10, 129, 130

[56] References Cited

U.S. PATENT DOCUMENTS

| | | | |
|---|---|---|---|
| 4,672,187 | 6/1987 | Fujita et al. . | |
| 4,779,259 | 10/1988 | Kono et al. | 369/112 |
| 4,794,585 | 12/1988 | Lee | 369/44.23 X |
| 4,833,561 | 5/1989 | Sunagawa et al. | 360/114 |
| 4,868,803 | 9/1989 | Sunagawa et al. | 369/13 X |
| 4,876,680 | 10/1989 | Misawa et al. | 369/110 |
| 4,885,732 | 12/1989 | Sunagawa et al. . | |
| 4,937,808 | 6/1990 | Shimada et al. | 369/44.11 X |
| 5,050,154 | 9/1991 | Shimozawa et al. | 369/44.14 X |
| 5,070,488 | 12/1991 | Fukushima et al. | 369/44.12 |
| 5,231,620 | 7/1993 | Ohuchida | 369/44.12 X |
| 5,233,595 | 8/1993 | Kawakubo | 369/44.12 X |

OTHER PUBLICATIONS

Li, *Application of Diffraction Grating Theory to Analysis and Fabrication of Waveguide Gratings*, Ph.D. Disertation, University of Arizona, vol. 49, No. 5, Nov. 1988.
Alling et al., *Image Reversal of Positive Photoresist*, SPIE Proceedings, vol. 539, Advances in Resist Technology, p. 194 (1985).

*Primary Examiner*—W. R. Young
*Attorney, Agent, or Firm*—Raymond L. Owens

[57] ABSTRACT

An optical device for detecting focus error, tracking error and recorded data in an optical head system has a grating plate having a plurality of gratings and waveguides. The gratings are fabricated by holographic exposure of a resist layer spin-coated onto a glass substrate. The gratings include a processing grating to efficiently input couple light into the waveguide and to effect a desired change in the input coupling efficiency with defocus of a beam of light at an optical disk. The optimum pattern of the processing grating is based on the location and intensity variation of diffraction orders in the beam returning from the optical disk and appodization of the beam. Unfocused beams and large active areas of the detectors relax the tolerance for detector placement so that placement is not critical. The four focus and tracking detectors and data detector needed for complete signal processing are compactly formed on single chip.

22 Claims, 3 Drawing Sheets

PICK-UP DEVICE FOR OPTICAL DISK READOUT USING WAVEGUIDE GRATINGS

This is a Continuation of application Ser. No. 004,026, filed 15 Jan. 1993, now abandoned.

TECHNICAL FIELD OF THE INVENTION

The present invention relates generally to optical systems, and, more particularly, to an integrated optical pick-up head employing waveguide gratings for signal generation.

BACKGROUND OF THE INVENTION

There has been increasing interest in the use of integrated optical systems for optical recording technology because waveguide systems have several advantages over conventional optical systems including reduced size and weight, component alignment as part of fabrication, integration of optical elements with detectors and electronics on the same substrate, and processing techniques. Integrated optical system have been designed to serve as transmitters to deliver light to an optical disk, or receivers for processing information contained in the beam returning from the optical disk. Waveguide gratings have been the primary element for input and output coupling light considered for transmitters and receivers. When used as receivers, waveguide gratings can be designed to sample different areas or attributes of the return beam and perform multiple functions to contribute to signal processing (i.e., focusing of input coupled beams, beam splitting, polarization selective coupling, etc.).

One early concept for utilizing integrated optics to perform transmitter and receiver functions is disclosed in U.S. Pat. No. 4,779,259. Disclosed is a grating used to focus an optical beam exiting from a waveguide onto an optical disk using a single grating element having a curvature and chirping in the design of the grating grooves. The returning light was received through the same element and two gratings in the waveguide optical path were used to divide the guided beam to obtain focus error information. U.S. Pat. Nos. 4,833,561, 4,868,803 and 4,885,732 disclose concepts for use of gratings, designed to be only a receiver, having three sections to detect signals from a magneto-optical disk. The center section of the grating differs from the outer sections by the groove pitch and a resulting sensitivity to TM polarized light rather than TE polarized light at the incident angle of the return beam. Each of the gratings has curved grooves to focus the three beams within the waveguide for optical processing of the focus error and reduced detector size. Similarly, U.S. Pat. No. 4,876,680 discloses sectioning a grating by the orientation of the grating grooves as a novel method of detecting tracking error signal. These patents are exemplary of the use of gratings as input couplers and optical elements to detect focus errors based on the pupil obscuration method.

U.S. Pat. No. 4,672,187 discloses a device which performs as both transmitter and receiver with separate input and output coupling gratings. The receiver grating detects focus errors based on the coupling efficiency of the return beam. Unfortunately, this device is limited in its application because it does not allow for orthogonal detection of the tracking and focus error signals. Also, there is no optimization of the grating pattern in the area of the beam to optimize the signal generated for servo operation in an optical head. Accordingly, it will be appreciated that it would be highly desirable to have an optical head that facilitates orthogonal detection of the tracking and focus error signals, and optimizes the grating pattern in the area of the beam to maximize the signal generated for servo operation.

FIG. 1 is a schematic diagram of a conventional write-once optical recording head 10 for writing on a recording layer 12 of an optical disk 14. The apparatus comprises a diode laser 16 which emits radiation that is collimated by a lens 18 and directed to a circularizing prism 20 and polarizing beam splitter 22. The beam encounters quarter wave plate 24 before an objective lens and actuator 26 on the way to the recording layer 12 of the disk 14. From the polarizing beam splitter 22 the beam returning from the disk goes to a second beam splitter 28 where a portion of the beam is directed to tracking error and data detectors 30 by processing lens 32. The other portion of the beam is directed to focus error detectors 34 by processing lens 36 and knife edge 38. The optical head profile is indicated by a dotted line 40. This device is not as limited in its application and does allow for orthogonal detection of the tracking and focus error signals. It does require precise alignment of the optical components and is bulky. Accordingly, it will be appreciated that it would be highly desirable to have an optical head that facilitates orthogonal detection of the tracking and focus error signals that is compact in size and does not require precision alignment of the detectors located at the focal position of the processing lenses 32 and 36.

SUMMARY OF INVENTION

The present invention is directed to overcoming one or more of the problems set forth above. Briefly summarized, according to one aspect of the invention, an optical device for detecting focus error, tracking error and recorded data in a read-only or read-write optical head system comprises a grating plate having a plurality of gratings and respectively associated waveguides, an optical condensing lens, and focus, tracking and data detectors. The optical device also comprises a mounting frame having internal stops and openings for holding said grating plate, condensing lens, and detectors, said mounting frame having openings for wire feedthrough to said detectors, and an incline on said mounting frame for receiving said grating plate and tilting said grating plate at a preselected angular orientation for input coupling.

The gratings are fabricated by holographic exposure techniques. The gratings include a processing grating to efficiently input couple light into the associated waveguide and to effect a desired change in the input coupling efficiency with defocus of a beam of light at an optical disk, an isolation grating for decoupling light that has been scattered within a waveguide due to defects in the waveguide or associated input coupling grating, and an interchip grating to couple light already processed efficiently to the focus and tracking detectors. The optimum pattern of the processing grating is based on the location and intensity variation of diffraction orders in the beam returning from the optical disk attributed to tracking errors, and the appodization of the beam attributed to the type of light source.

Unfocused beams and large active areas of the detectors relax the tolerance for detector placement so that placement is not critical. The four focus and tracking detectors and data detector needed for complete signal processing are included compactly in a single chip.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
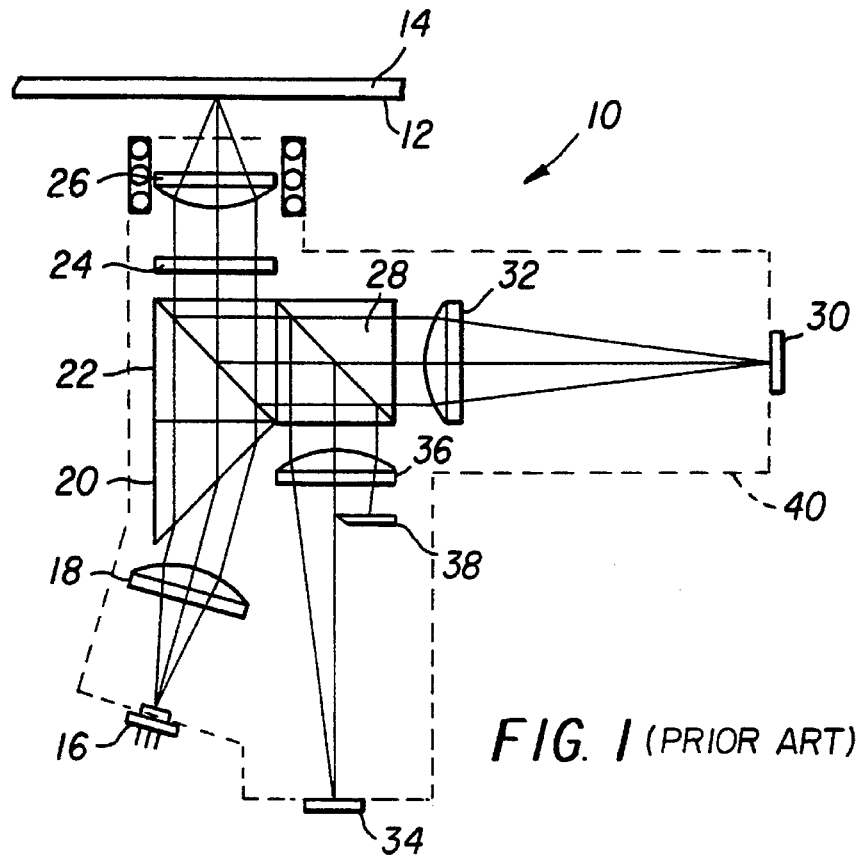
FIG. 1 is a schematic diagram of a conventional write-once optical recording head.
Figure 2:
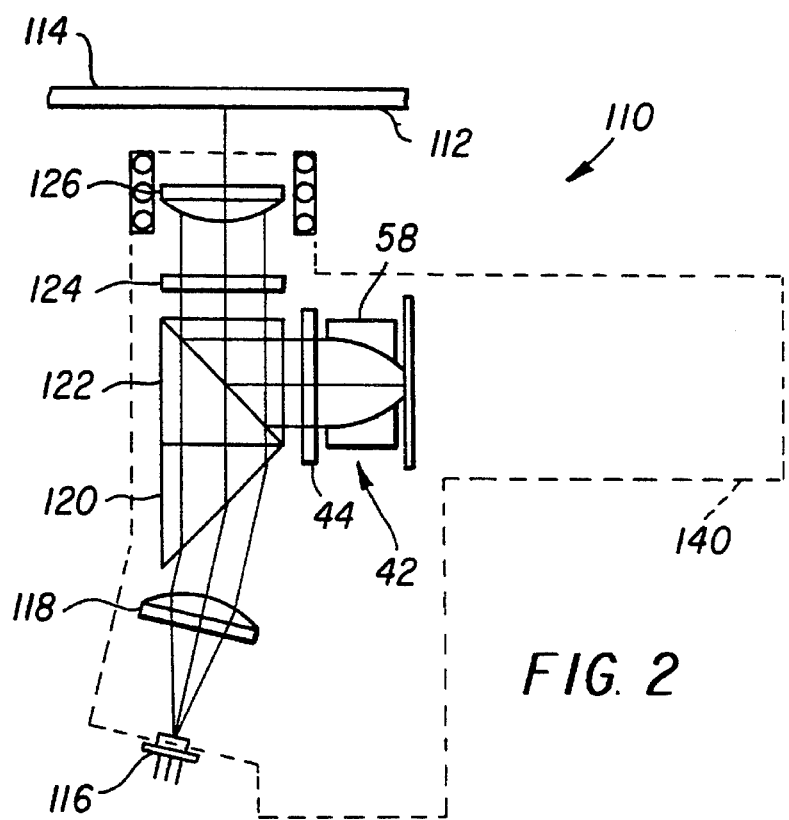
FIG. 2 is a schematic diagram of a preferred embodiment of a write-once optical recording head similar to FIG. 1, but with an integrated optical receiver replacing the conventional components used in signal processing.

FIG. 2 is a schematic diagram of a preferred embodiment of a write-once optical recording head 110 for writing on a recording layer 112 of an optical disk 114. The apparatus comprises a diode laser 116 which emits radiation that is collimated by a lens 118 and directed to a circularizing prism 120 and polarizing beam splitter 122. The beam encounters quarter wave plate 124 before an objective lens and actuator 126 on the way to the recording layer 112 of the disk 114. From the polarizing beam splitter 122 the split beam goes to an integrated optical receiver 42. The integrated optical receiver 42 integrates the second beam splitter 28, tracking error and data detectors 30, processing lens 32, focus error detectors 34, processing lens, 36 and knife edge 38 which are the conventional signal processing components illustrated in the conventional design of FIG. 1.

Figure 3:
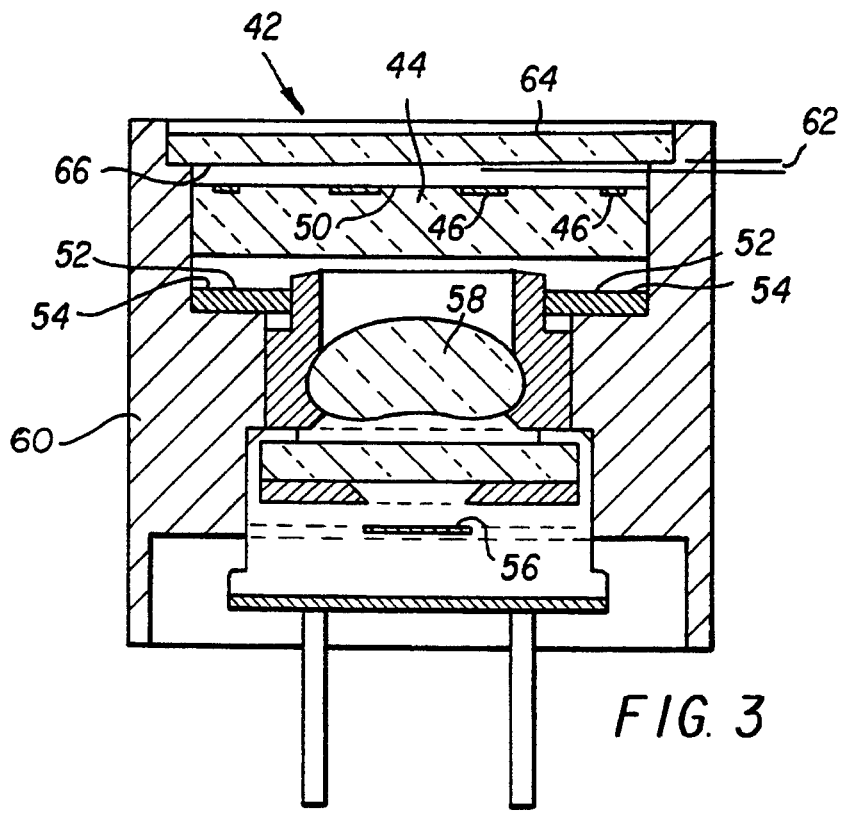
FIG. 3 is a somewhat enlarged sectional view of one embodiment for the grating plate and detectors of FIG. 2.
Figure 4:
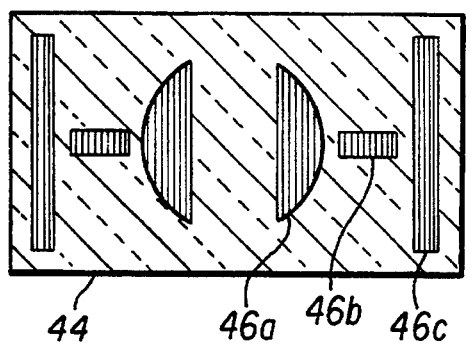
FIG. 4 is a plan view of one embodiment for the grating plate of FIG. 3.

Referring to FIGS. 2–4, the integrated optical receiver 42 includes a grating plate 44 that has a plurality of gratings 46 with patterns of parallel grooves to perform different functions, and respectively associated waveguides 50. The receiver 42 also includes focus detectors 52, tracking detectors 54, and a data detector 56. Detectors 52 and 54 are preferably different areas of the same elements which generate independent photo currents which can be summed and differenced differently to obtain focus and tracking errors. An optical condensing lens 58 reduces the cross-sectional area of the beam to easily fit the beam onto the active area of the data detector 56. A mounting frame 60 has internal stops and openings for holding the grating plate 44, condensing lens 58, detectors 52, 54, 56, and has openings or channels for wire feedthrough to the detectors. An incline 62 on the mounting frame 60 receives the grating plate 44 and tilts the grating plate 44. It is noted that the outline of the receiver in FIG. 2 more nearly matches the device of FIG. 6, but the embodiment of FIG. 3 is preferred because its uses readily available components rather than custom made components.

The optical elements and detectors are held by the mounting frame 60 that is illustrated as a machined part. The frame contains channels for the detector leads, stops and openings for the different elements, and an offset for attachment of an electronic board to the bottom of the frame. The wedge or incline 62 added to the top surface tilts the grating plate 44 to the proper angle for input coupling when attached to the optical head 110.

A cover plate 64 is provided for protection of the gratings 46 from fingerprints and dust. The plate 64 is thin to reduce the overall height and weight of the device, and is preferably coated with an antireflection coating to increase the efficiency of light entry into the system. An aluminum layer 66 at the ends and over the entire width is included to reflect light back to the detectors that has been output coupled towards the cover plate 64. Also, there is a slight tilt of the cover plate 64 relative to the grating plate 44 to prevent the reflected light from coupling back into the waveguide 50. This tilt angle is conveniently the same as the incline 62 added to the frame 60.

The gratings 46 are preferably fabricated by holographic exposure of a resist layer spin coated onto a glass substrate. Holographic techniques are described by Li, *Application of Diffraction Grating Theory to Analysis and Fabrication of Waveguide Gratings*, Ph.D. Dissertation, University of Arizona (1988). Once the resist layer has been exposed, patterning of the grating is done by one of two methods. The first method is using an optical mask with an image reversal process to form the pattern in the resist layer, and using the resist as a physical mask and milling the image of the grating into the substrate via standard ion milling procedures. The image reversal process has been described by Long et al., *Image Reversal Techniques With Standard Positive Photoresist*, SPIE Proceedings, Vol. 539, Advances in Resist Technology, p. 194 (1985). The second method is forming the resist grating uniformly over the substrate and producing the grating pattern by placing a thin metal foil containing the pattern atop the resist layer during the milling process. The image reversal process is the preferred method of fabricating the grating image because multiple grating patterns can be formed through a single processing sequence. The substrate can then be diced to separate the elements or used as a pattern source for generation of masters and replicas by embossing, replicating or molding techniques.

The pattern of the grating is shown in FIG. 4. Each area of different shape performs a different function. A processing grating 46a is designed to efficiently input couple light into the waveguide 50 and to effect a desired change in the input coupling efficiency with defocus at the optical disk 114. An isolation grating 46b is provided for decoupling light that has been scattered within the waveguide 50 due to defects in the waveguide 50 or grating plate 44. The interchip grating 46c is used to couple the light already processed efficiently to the photodiode focus and tracking detectors 52, 54. The isolation and interchip gratings 46b, 46c are not considered to have a critical design only a short coupling length, but the processing grating 46a should have an optimum shape for the efficiency of input coupling, the angular response of the grating, and pattern and location of the element.

Figure 5:
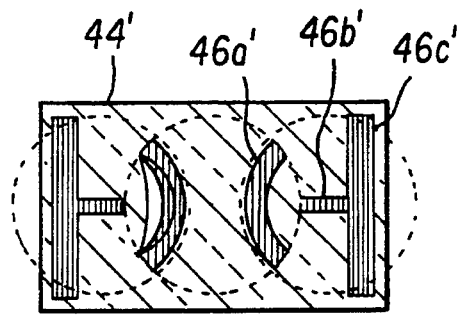
FIG. 5 is a plan view of the grating plate of FIG. 3 that is similar to FIG. 4, but illustrates another preferred embodiment.

The optimum pattern of the processing grating 46a is based on the location and intensity variation of the diffraction orders in the beam returning from the disk 114 and the appodization of the beam. There are two key criteria for design. One criteria is maximizing the light reaching the detectors for focus and tracking error signal processing during a readout when the laser is operated at low powers. A second criteria is extending the working range of the focus servo system. The directions for grating design are expected to include the addition of a blaze to the groove pattern for increased efficiency, reducing the grating length to increase the working range, and moving the pattern towards the center of the return beam to collect more light. FIG. 5 illustrates the preferred changes to the grating pattern.

The data recorded on the write-once optical disk 114 is read back as intensity modulation of the return beam and this readout occurs at rates limited by the spin speed of the optical disk and the speed on the processing electronics and associated algorithms. To keep light detection from becoming the limiting factor for readout rates, the data detector 56 is selected to have a sufficiently fast rise time. A detector 56 with an active area less than the cross-sectional area of the return beam is used. Thus, the condensing lens 58 is used to reduce the cross-sectional area to easily fit the light onto the active area of the detector. For testing the device, a precision glass molded lens was fabricated. The short focal length of the lens was desirable to reduce the overall height of the device, and the lens mount fit 68 well into the design of the device mounting frame 60.

The segmented processing grating 46a creates four distinct channels to be detected. Focusing of these individual beams onto small area detectors is not necessary because the detection of focus and tracking errors occurs at a considerably slower rate than data detection. With unfocused beams and the large active areas of the detectors, the tolerance for detector placement is greatly relaxed.

The data detector was a standard detector used for such applications. Selection of the detector was based on the desire to reduce the area with a circular pattern and shorter wavelength enhanced sensitivity. The packaging of the detector also fit well into the design of the mounting frame with direct contact between it and the condensing lens mount.

Figure 6:
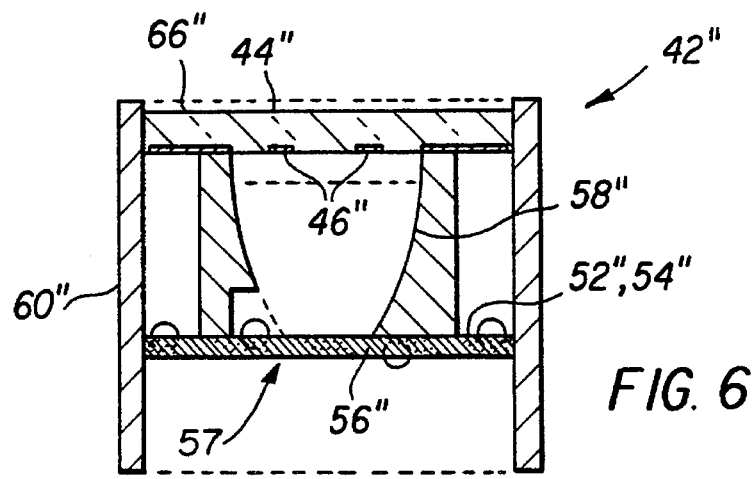
FIG. 6 is a sectional view of the grating and detector similar to FIG. 3, but illustrating another preferred embodiment.

Referring now to FIG. 6, another embodiment is illustrated wherein the mounting frame 60" is a custom molded plastic part. The device 42" is greatly simplified by obtaining custom elements, rather than the readily available elements used for the embodiment illustrated in FIGS. 2–5. The mounting frame 60" includes stops and openings for the grating plate 44" and detector chip 57, and offset for attachment of an electronic board, openings for wire feedthroughs and space for solder bumps, a dimensional wedge added to the top surface, and an optical condensing element 58". The condensing element 58" is a special design of the center opening to reduce the diameter of the beam at the detector chip 57, which includes focus detector 52", tracking detectors 54", and data detector 56". The condensor wall may be coated with a highly reflecting material to maximize light collection.

The gratings 46" are located on the bottom of the plate 44" to protect them from exposure to contact and dust. The upper surface of the plate 44" is coated with a reflecting layer, and an antireflection layer is added to the upper surface. The function of the plate 44" remains the same but these changes have eliminated the need for a cover plate. The five detectors 52", 54", 56" needed for complete signal processing have been included in single chip 57 rather than discrete devices.

Figure 7:
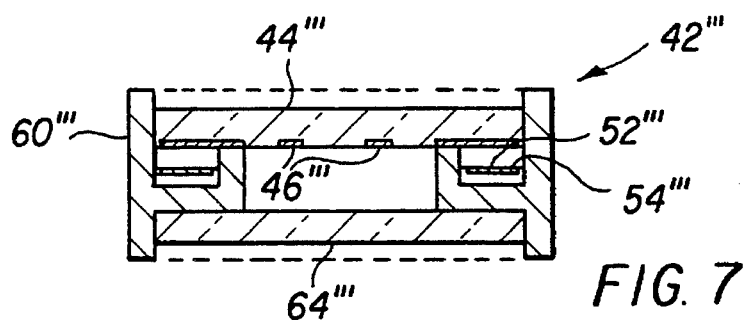
FIG. 7 is a sectional view of the grating and detector similar to FIGS. 3 and 6, but illustrating another preferred embodiment.
Figure 8:
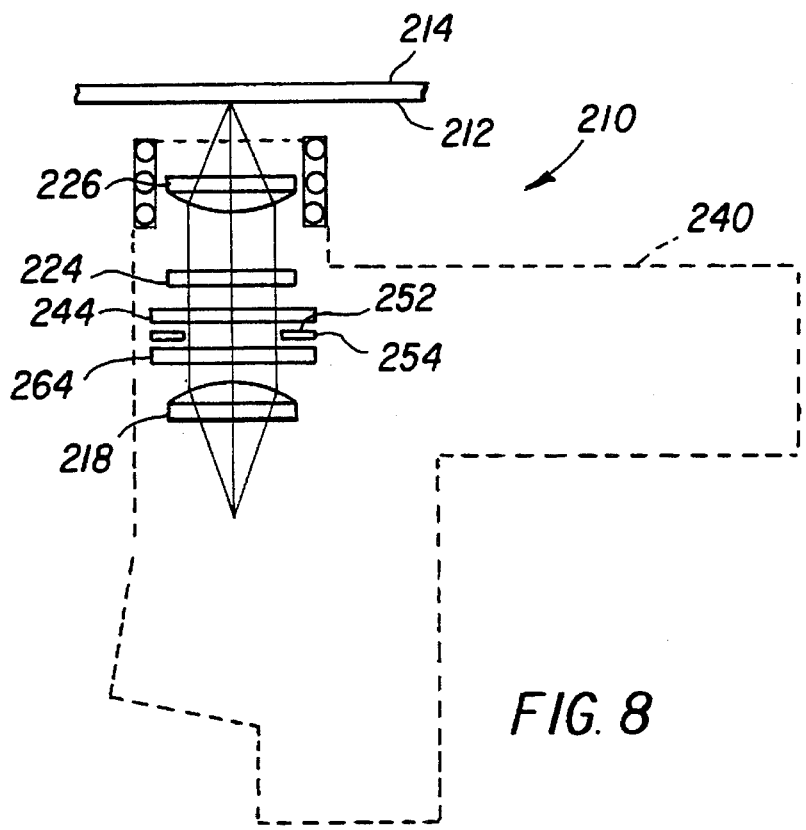
FIG. 8 is a schematic diagram similar to FIG. 2, but illustrating another preferred embodiment.

Referring now to FIGS. 7–8, another embodiment of the device produces only focus and tracking error signals and is designed to be transmissive to a large portion of the incident beam. The mount 60" is constructed of molded plastic and includes all the features discussed for the embodiments in FIGS. 2–6, excluding the light condensing feature. The grating plate 44" is the same design as used in FIG. 3. Detectors 52", 54" could be four individual elements, split detector pairs, or a quad-detector set with a centered opening in the plate 44". A cover plate 64" is added to seal the system from dust and prevent any contact of the surface containing the grating pattern. As an alternative to the cover plate 64", the waveguide grating could be coated with an encapsulation layer for protection of the grating surface. This plate is coated on both surfaces with an antireflection coating.

An optical head system 210 utilizing the device 240 is shown in FIG. 8. This design reduces the mass and volume of the elements moved by a radial access system above an optical disk 214. A fiber is used to deliver light to the head and return light to the source location for detection of the data signal. The analysis of focus and tracking error information must be completed before coupling light back into the fiber because this information will not be maintained. Sensitivity of the grating device to the propagation direction of the beam is achieved by the intrinsic polarization sensitivity of the waveguide grating 244. A polarization preserving fiber is used to deliver light to the head. The light is collimated by lens 218 and directed to quarter wave plate 224 then an objective lens and actuator 226 on the way to the recording layer 212 of disk 214, and, for the initial polarization of the beam, no light is coupled into the waveguide system. Upon return from the optical disk 214, the beam will have passed through the quarter-wave 224 plate twice and the polarization will be rotated by 90°. The waveguide system, including focus detector 252 and tracking detector 254, will sample this beam polarization and produce the focus and tracking error signals. The light passing through the device 240 will be coupled back into the fiber and return to the source location. A cover plate 264 is added to seal the system, as described above in relation to FIG. 7.

While the invention has been described with particular reference to the preferred embodiments, it will be understood by those skilled in the art that various changes may be made and equivalents may be substituted for elements of the preferred embodiment without departing from invention. For example, a combination of gratings and detectors can be fabricated on the same chip to produce an opto-electronic integrated circuit. The gratings could be fabricated by holographic processing or the use of electron beam lithography and the issue of coupling light within the waveguide to the detectors has been previously addressed. Because of component integration, the device would be even further simplified. In addition, many modifications may be made to adapt a particular situation and material to a teaching of the invention without departing from the essential teachings of the present invention.

It can now be appreciated that there has been presented a device that acts as a receiver to detect focus error, tracking error and recorded data in read-only or read-write head systems. This device has the advantage of reduced volume and mass and relaxed tolerances for detector alignment compared to bulk optical components used for signal processing. Different regions and polarization of the optical beam were obtained by creating distinct grating areas and stacking gratings with separate waveguide layers.

It can also be appreciated that a method for forming an optical device for detecting focus error, tracking error and recorded data in a read-only or read-write optical head system has been presented. The method includes forming a grating plate having a plurality of gratings and respectively associated waveguides, forming an optical condensing lens, forming a focus detector, forming a tracking detector, and forming a data detector. The method includes forming a mounting frame having internal stops and openings for holding the grating plate, condensing lens, and detectors, with the mounting frame having openings for wire feedthrough to the detectors, and forming an incline on the mounting frame for receiving the grating plate and tilting the grating plate at a preselected angular orientation for input coupling. Forming an offset on the mounting frame for attaching an electronic board and placing a cover plate on the mounting frame to protect the grating plate or adding an encapsulation layer to directly protect the waveguide grating completes the method. The method may include fabricating the gratings by holographically exposing a resist layer spin-coated onto a glass substrate, patterning the gratings by using an optical mask with an image reversal process and forming a pattern in the resist layer, using the resist layer as a physical mask, and milling the pattern of the grating into the substrate via ion milling after exposing the resist layer. The method may also include patterning the gratings by forming the resist layer uniformly over the substrate and producing the grating pattern by placing a thin metal foil containing the pattern atop the resist layer during the milling process after exposing and developing the resist layer.

As is evident from the foregoing description, certain aspects of the invention are not limited to the particular details of the examples illustrated, and it is therefore contemplated that other modifications and applications will occur to those skilled the art. It is accordingly intended that the claims shall cover all such modifications and applications as do not depart from the true spirit and scope of the invention.

What is claimed is:

1. An optical device for detecting focus error, tracking error and recorded data in a read-only or read-write optical head system, comprising:
   a diffraction grating consisting of a grating plate having a plurality of linear gratings and respectively associated waveguides for input coupling an optical beam;
   an optical condensing lens;
   a focus detector;
   a tracking detector;
   a data detector;
   a mounting frame having internal stops and openings for holding said grating plate, condensing lens, and detectors, said mounting frame having openings for wire feedthrough to said detectors; and
   an incline on said mounting frame for receiving said grating plate and tilting said grating plate at a preselected angular orientation for input coupling;
   wherein all of said optical beam that is processed for detecting focus and tracking error is input coupled into said waveguide by said diffraction grating.

2. An optical device, as set forth in claim 1, wherein said mounting frame has an offset for attachment of an electronic board.

3. An optical device, as set forth in claim 1, including a cover plate on said mounting frame to protect said grating plate.

4. An optical device, as set forth in claim 1, wherein said gratings have patterns of parallel grooves of several different shapes to perform several different functions.

5. An optical device, as set forth in claim 4, including a processing grating to efficiently input couple light into the associated waveguide and to effect a desired change in the input coupling efficiency With defocus of a beam of light at an optical surface.

6. An optical device, as set forth in claim 5, wherein the optimum pattern of the processing grating is based on the location and intensity variation of diffraction orders in the beam returning from the optical surface and appodization of the beam.

7. An optical device, as set forth in claim 4, including an isolation grating for decoupling light that has been scattered within a waveguide due to defects in the waveguide or associated grating.

8. An optical device, as set forth in claim 4, including an interchip grating to couple light already processed efficiently to the focus and tracking detectors.

9. An optical device, as set forth in claim 4, including adding a blaze to the groove pattern for increased efficiency.

10. An optical device, as set forth in claim 4, including reducing the grating length to increase working range.

11. An optical device, as set forth in claim 4, including moving the pattern towards the center of the return beam to collect more light.

12. An optical device, as set forth in claim 1, wherein five detectors needed for complete signal processing are included in single chip.

13. An optical device, as set forth in claim 1, wherein the condensing lens has a frame and the data detector fits into the mounting frame with direct contact between the detector and the condensing lens frame.

14. An optical device for detecting focus error, tracking error and recorded data in a read-only or read-write optical head system using a beam of light with a cross-sectional area, comprising:
    a diffraction grating consisting of a grating plate having a plurality of linear gratings and respectively associated waveguides for input coupling the beam, said gratings having patterns of parallel grooves to produce optical signals for focus error detection and tracking error detection;
    a focus detector;
    a tracking detector;
    an optical condensing lens, said lens reducing the cross-sectional area of the beam to easily fit the beam onto active areas of a data detector for data detection;
    a mounting frame having internal stops and openings for holding said grating plate, condensing lens, and detectors, said mounting frame having openings for wire feedthrough to said detectors; and
    an incline on said mounting frame for receiving said grating plate and tilting said grating plate at a preselected angular orientation for input coupling the beam,
    wherein all of the beam that is processed for detecting focus and tracking error is input coupled into said waveguide by said diffraction grating.

15. An optical device, as set forth in claim 14, wherein said grating plate includes:
    a processing grating to efficiently input couple light into the associated waveguide and to effect a desired change in the input coupling efficiency with defocus of a beam of light at an optical surface;
    an isolation grating for decoupling light that has been scattered within a waveguide due to defect in the waveguide or associated grating; and
    an interchip grating to couple light already processed efficiently to the focus and tracking detectors.

16. An optical device, as set forth in claim 15, wherein the optimum pattern of the processing grating is based on the location and intensity variation of diffraction orders in the beam returning from the optical surface and appodization of the beam.

17. An optical device, as set forth in claim 14, wherein five detectors needed for complete signal processing are included in single chip.

18. An optical device, as set forth in claim 14, including a cover plate to protect said grating plate.

19. An optical device, as set forth in claim 14, including an encapsulation layer added to said grating to protect said grating.

20. A method for forming an optical device for detecting focus error, tracking error and recorded data in a read-only or read-write optical head system, comprising:

forming a diffraction grating consisting of a grating plate having a plurality of linear gratings and respectively associated waveguides for input coupling an optical beam;

forming an optical condensing lens;

forming a focus detector;

forming a tracking detector;

forming a data detector;

forming a mounting frame having internal stops and openings for holding said grating plate, condensing lens, and detectors, said mounting frame having openings for wire feedthrough to said detectors; and forming an incline on said mounting frame for receiving said grating plate and tilting said grating plate at a preselected angular orientation for input coupling, wherein all of said optical beam that is processed for detecting focus and tracking error is input coupled into said waveguide by said diffraction grating.

21. A method, as set forth in claim 20, including forming an offset on said mounting frame for attaching an electronic board.

22. A method, as set forth in claim 20, including placing a cover plate on said mounting frame and protecting said grating plate.

* * * * *